UNITED STATES PATENT OFFICE.

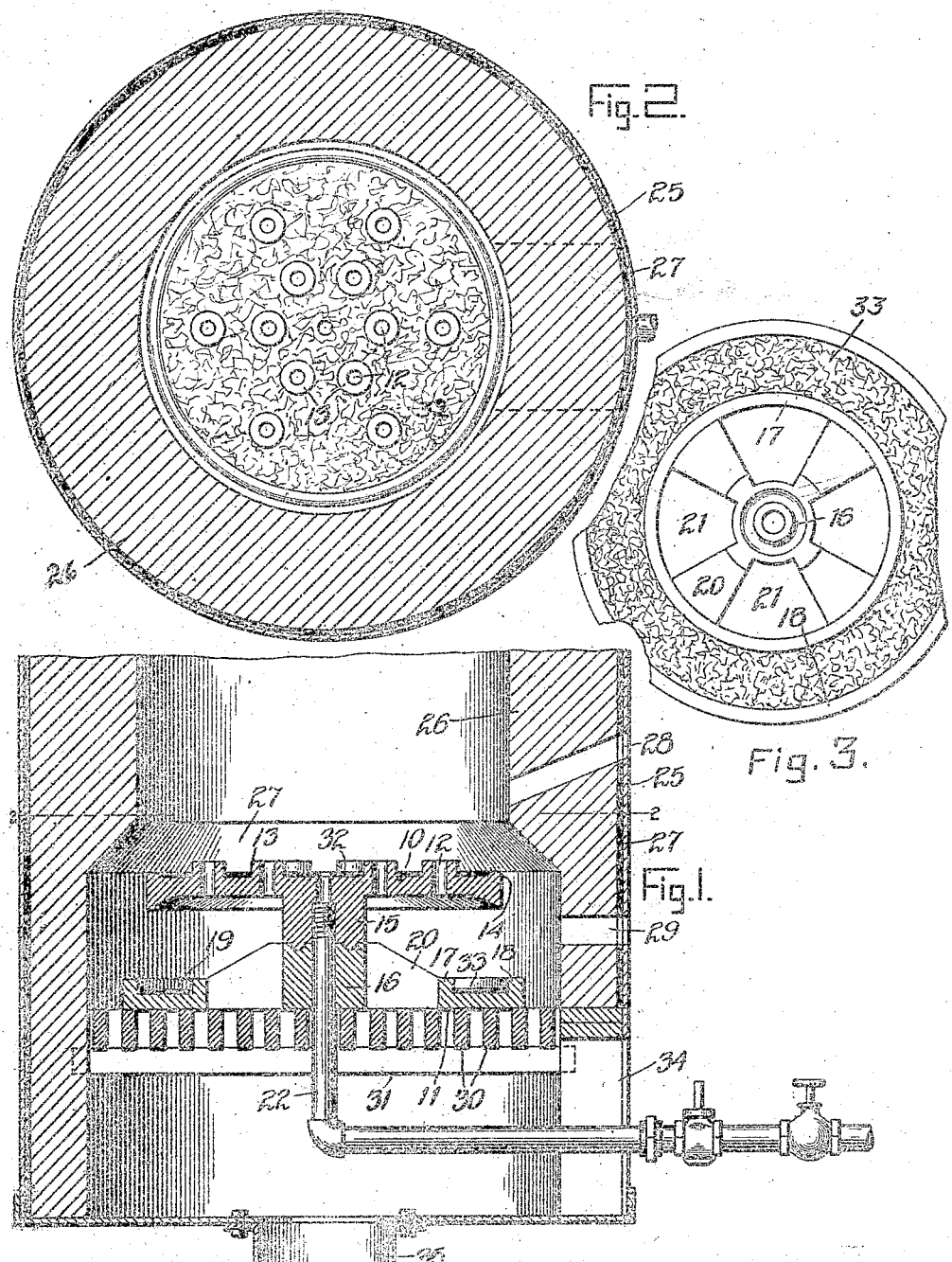

ANNIE H. BEST, OF NEW YORK, N. Y.

BURNER.

1,146,395.

Specification of Letters Patent. Patented July 13, 1915.

Application filed March 23, 1915. Serial No. 16,333.

*To all whom it may concern:*

Be it known that I, ANNIE H. BEST, a citizen of the United States, and resident of New York city, borough of Brooklyn, county of Kings, and State of New York, have invented certain new and useful Improvements in Burners, of which the following is a specification.

This invention relates to certain improvements in burners and more particularly to that type in which a quantity of oil is exposed in a pan or tray and a supply of combustion supporting air passes upwardly around the pan.

The main object of my invention is to simplify the construction so as to materially reduce the cost of manufacture and to secure the proper commingling of the air with the liquid or liquid vapor so as to secure proper combustion.

My invention involves certain details of construction which will be more particularly pointed out hereinafter and described in the claims.

Reference is to be had to the accompanying drawings in which I have illustrated one embodiment of my invention and in which drawings, similar reference characters indicate corresponding parts in the several views.

In these drawings, Figure 1 is a central vertical section through a burner and a portion of a furnace constructed in accordance with my invention; Fig. 2 is a transverse section on the line 2—2 of Fig. 1 and Fig. 3 is a plan view of a portion of the lower section.

In the specific form illustrated, I employ two main sections or platforms in the form of pans or trays 10 and 11 superposed and so arranged that the liquid fuel is delivered to the upper pan and permitted to overflow to the lower one. The upper pan as shown is in the form of a circular plate supported in a horizontal position and having a plurality of air passages 12 extending vertically therethrough. Each air opening is surrounded by an upwardly extending boss 13, while at the periphery of the pan there is an upwardly extending marginal flange 14. The bosses extend upwardly to a greater elevation than does the peripheral flange so that when the pan is flooded, the oil will overflow around the periphery rather than flowing down through the air passages.

The pan, at its center, has a depending hub 15 serving as a support for the pan and this rests upon a central hub 16 on the lower pan. The lower pan has two concentric, annular, upwardly extending flanges 17 and 18 which, with the bottom, form an annular trough or tray 19. The outer flange 18 of the lower pan is of larger diameter than is the upper pan or tray, while the inner flange 17 is of smaller diameter than said upper pan or tray. Thus, the annular chamber 19 lies beneath the periphery of the upper pan or tray and any oil or other liquid fuel which overflows from the upper tray or pan will collect in the chamber 19. The hub portion 16 of the lower pan is connected to the trough or chamber portion 19 by a plurality of radially extending, spaced arms or branches 20 which leave vertical air passages 21 therebetween. The two hubs have central passages therethrough so that an oil supply conduit 22 may extend up through the hub 16 and into the hub 15 and deliver oil to the upper surface of the upper pan. This supply of oil may be controlled in any suitable manner.

Although my improved burner may be installed in various different constructions where it is desired to produce heat—as for instance in a stove, heater, boiler, kiln, furnace, or other apparatus, still I preferably install it in a chamber constituting a combustion chamber and designed substantially as shown in the drawings. Here, there is a peripheral sheet metal wall 25 with a lining 26 of refractory material. In between the two there may be a thin layer of asbestos to protect the sheet metal wall from the excessive heat. The combustion chamber at its lower end is of a diameter slightly greater than the lower pan 11 while at its upper end, it is of substantially the same diameter as the upper pan 10. The inner surfaces of the two portions are connected by an inclined surface 27 which is disposed slightly above the upper pan, and deflects inwardly and over said pan, the air rising past the outer periphery of the pan. In operation, the air may rise through the annular space around the lower pan and through the air passages 21 in the latter and may flow upwardly through the air passages 12 in the upper pan and through the annular space around said upper pan. The oil is delivered to the upper pan and is permitted to overflow to the lower pan and combustion takes place from above. If desired, the supply may be so limited that very little, if any, overflows and substantially all of the combustion takes place at the upper pan. The condition of the combustion may be readily determined by inspection through two peep-holes 28 and 29 extending through the peripheral wall and each disposed slightly above its corresponding pan.

The device may be supported within the combustion chamber in any suitable manner but as shown I employ a series of grate bars 30 which themselves may be supported on transverse bars 31. Any fuel, such as kerosene, fuel oil, high grade crude oil, distillate, denaturized alcohol, may be employed. If denaturized alcohol is employed, it is preferable that the upper pan carry a covering or mat 32 of asbestos or other noncombustible fiber. A similar mat 33 may be employed to cover the bottom surface of the trough or chamber 19 of the lower pan. In case the burner is used where there is a suitable stack or natural draft is sufficient, the lower portion of the casing may open direct to the atmosphere, as, for instance, through an opening 34. If natural draft is insufficient, this opening may be closed in any suitable manner and air may be forced from a suitable blower through a conduit 35. By having the conduit extend through the bottom and concentric with the burner, a proper and uniform distribution of the air takes place. The refractory lining, particularly when arranged in connection with the burner, as shown, rapidly becomes heated to a high temperature and aids in the proper disassociation and combustion of the fuel. It will be noted that the inclined wall 27 is directly above such flame as arises from the lower annular chamber 19 and passes outside of the upper pan. Thus, the flame is deflected inwardly over the upper pan and across the surface of the burning oil.

In the specific form illustrated, I employ upper and lower pans or trays circular in form, but it is of course evident that the shape may vary in accordance with the shape of the chamber to be heated and therefore may be oval, square, rectangular or of any other desired form.

Having thus described my invention, what I claim as new and desire to secure by Letters Patent is:

1. A burner including two superposed pans or trays held rigid in respect to each other at their center portions, means for delivering a liquid fuel up through the central portions to the upper surface of the upper pan, said upper pan having a plurality of air passages extending vertically therethrough and each encircled by an upwardly extending boss, and said upper pan having a peripheral flange of less height than said bosses, and a mat of non-combustible material disposed upon the upper surface of said upper pan and having apertures through which said bosses extend.

2. A burner including a pair of superposed trays, the lower tray having an annular bottom wall and two upwardly extending walls defining an annular chamber, a central hub, branches connecting said hub with said walls and spaced apart to leave apertures therebetween, and said upper tray having a depending hub resting upon said first mentioned hub and having a peripheral overflow flange disposed above said annular chamber and of less diameter than one of said upwardly extending walls and of greater diameter than the other, and means for delivering liquid fuel up through said hubs to the upper surface of said upper tray.

3. In combination, a burner having two superposed trays, the lower tray being of larger diameter than the upper tray and having an annular trough beneath the peripheral edge of the upper tray, both of said trays having air passages leading upwardly therethrough and walls preventing the flow of liquid fuel down through said passages, and an upwardly and inwardly inclined wall of refractory material adjacent the periphery of the upper tray for deflecting inwardly over said upper tray the flames rising from said lower tray around said upper tray.

Signed at New York city in the county of New York and State of New York this 22nd day of March A. D. 1915.

ANNIE H. BEST.